(12) United States Patent
Moore et al.

(10) Patent No.: US 10,811,956 B2
(45) Date of Patent: *Oct. 20, 2020

(54) POWER CONVERTER FAULT DETECTION BY COUNTING REQUEST PULSES

(71) Applicant: Power Integrations, Inc., San Jose, CA (US)

(72) Inventors: Karl Moore, Ely (GB); Antonius Jacobus Johannes Werner, Cambridge (GB)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,897

(22) Filed: Jun. 5, 2019

(65) Prior Publication Data

US 2019/0356216 A1    Nov. 21, 2019

Related U.S. Application Data

(63) Continuation of application No. 15/985,488, filed on May 21, 2018, now Pat. No. 10,355,583.

(51) Int. Cl.
| | |
|---|---|
| *H02M 1/32* | (2007.01) |
| *H02M 1/36* | (2007.01) |
| *H02M 3/335* | (2006.01) |
| *H02M 1/00* | (2006.01) |

(52) U.S. Cl.
CPC .............. *H02M 1/32* (2013.01); *H02M 1/36* (2013.01); *H02M 3/33561* (2013.01); *H02M 3/33592* (2013.01); *H02M 1/00* (2013.01); *H02M 2001/0009* (2013.01)

(58) Field of Classification Search
CPC ............ H02M 1/00; H02M 1/32; H02M 1/36; H02M 2001/0009
See application file for complete search history.

(56) References Cited

U.S. PATENT DOCUMENTS

| | | | |
|---|---|---|---|
| 6,337,788 B1 | 1/2002 | Balakrishnan et al. | |
| 10,355,583 B1 * | 7/2019 | Moore | ..................... H02M 1/32 |
| 2004/0218319 A1 * | 11/2004 | Sae-Ueng | ............... H02M 1/36 361/18 |
| 2015/0326008 A1 | 11/2015 | Baurle et al. | |
| 2017/0366091 A1 * | 12/2017 | Langeslag | ............... H02M 1/08 |
| 2018/0041130 A1 * | 2/2018 | Kunz | ................ H02M 3/33523 |

\* cited by examiner

*Primary Examiner* — Thienvu V Tran
*Assistant Examiner* — Nusrat Quddus
(74) *Attorney, Agent, or Firm* — Brian H. Floyd

(57) ABSTRACT

A controller for a multiple output power converter, including an error amplifier configured to generate an error signal based on a difference between an output signal of a multiple output power converter and a reference signal. A switch request circuit is configured to generate a request signal in response to the error signal. The switch request circuit is further configured to control a switching of a power switch of the multiple output power converter to transfer energy from an input of the multiple output power converter to an output of the multiple output power converter. A power limit fault circuit is configured to receive the request signal and the error signal, the power limit fault circuit further configured to generate a first fault signal in response to detection of an output overload or short circuit.

14 Claims, 5 Drawing Sheets

POWER CONVERTER FAULT DETECTION BY COUNTING REQUEST PULSES

CROSS-REFERENCE TO RELATED APPLICATION

The application is a continuation of U.S. patent application Ser. No. 15/985,488, filed May 21, 2018, now pending, the contents of which are incorporated herein by reference in their entirety.

BACKGROUND INFORMATION

Field of the Disclosure

The present invention relates generally to power converters, and more specifically a controller detecting a power limit fault.

Background

Electronic devices (such as cell phones, tablets, laptops, etc.) use power to operate. Switched mode power converters are commonly used due to their high efficiency, small size, and low weight to power many of today's electronics. Conventional wall sockets provide a high voltage alternating current. In a switching power converter, a high voltage alternating current (ac) input is converted to provide a well-regulated direct current (dc) output through an energy transfer element to a load. In operation, a switch is turned ON and OFF to provide the desired output by varying the duty cycle (typically the ratio of the on time of the switch to the total switching period), varying the switching frequency, or varying the number of on/off pulses per unit time of the switch in a switched mode power converter.

A power converter controller can have terminals and associated circuitry to monitor various power converter parameters such as input voltage, input current, output voltage, output current, etc. The power converter controller can respond to various parameters in order to provide a regulated output.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
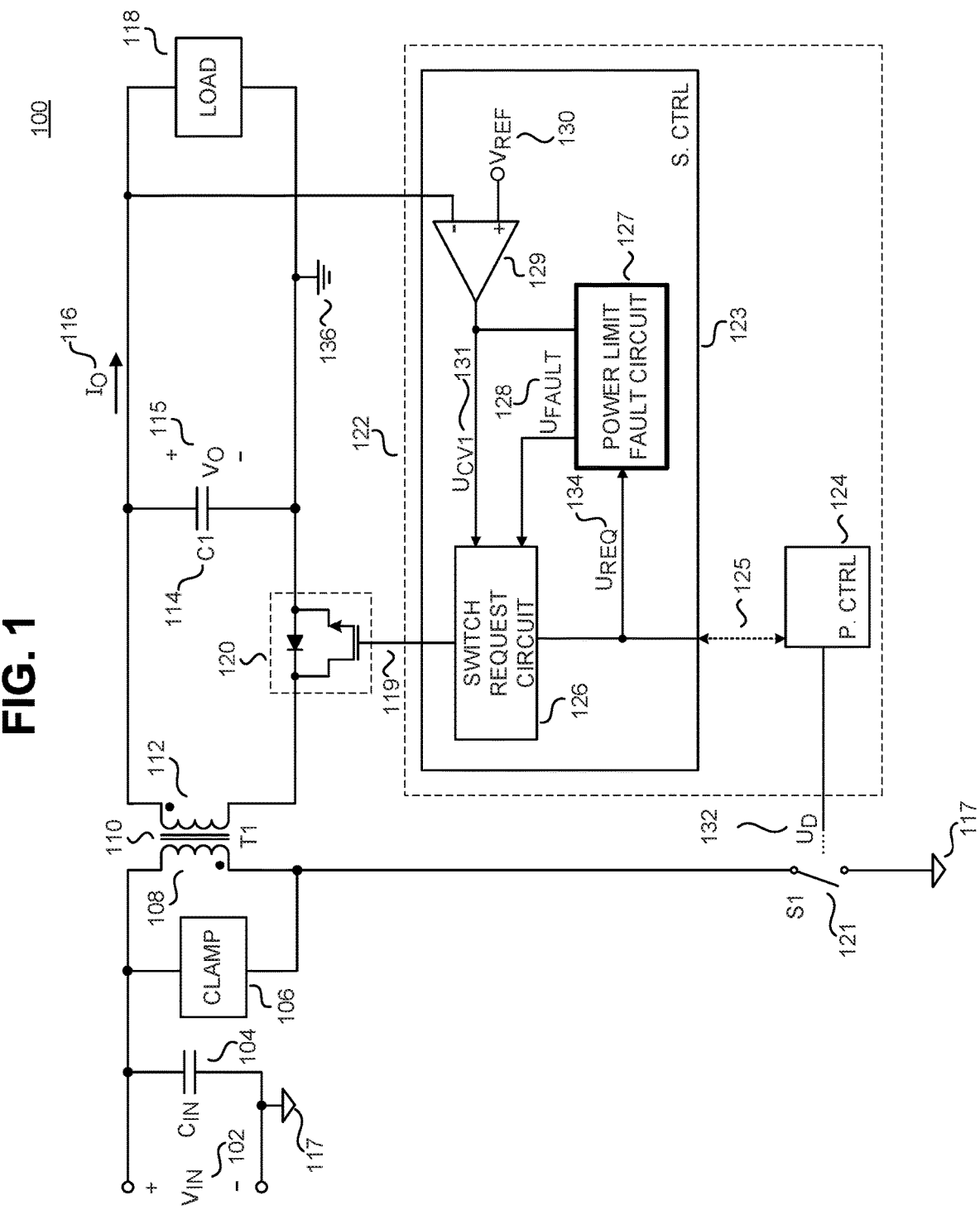
FIG. 1 illustrates one example of a power converter with a controller that can detect a fault in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of a power converter that can detect a fault are described herein. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example," or "an example" means that a particular feature, structure or characteristic described in connection with the embodiment or example is included in at least one embodiment of the present invention. Thus, appearances of the phrases "in one embodiment," "in an embodiment," "one example," or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

A controller for a power converter can use a current sense resistor to determine overload and short circuit fault conditions. For a power converter with multiple outputs, the number of current sense resistors to determine such faults increases. As will be described, a controller can detect a power limit fault indicative of an overload fault condition and a short circuit fault condition without the need for current sense resistors in accordance with the teachings of the present invention.

To illustrate, FIG. 1 illustrates one example of a power converter with a controller that can detect the existence of a fault in a power converter accordance with the teachings of the present invention. As shown in the depicted example, power converter 100 includes an input configured to receive an input voltage 102 across an input capacitor $C_{IN}$ 104 that is coupled to an input return 117. An energy transfer element 110 is coupled between the input of the power converter 100 and an output of the power converter 100, which is coupled to a load 118 that is coupled to an output return 136. In the example, the output return 136 at the output of the power converter 100 is galvanically isolated from the input return 117 at the input of the power converter. As such, there is no dc current between the input of the power converter 100 and the output of the power converter 100. The energy transfer element 110 includes a primary winding 108, which may also be referred to as an input winding, and a secondary winding 112, which may also be referred to as an output winding. A clamp circuit 106 is coupled across the primary winding 108, and an output capacitor C1 114 is coupled to the output of the power converter 100 to provide an output voltage $V_O$ 115 across the load 118. In addition, an output current $I_O$ 116 is also provided to the load 118 at the output of the power converter 100.

In the example shown in FIG. 1, a power switch 121 is coupled to the primary winding 108 and the input return 117 at the input of the power converter 100. The power switch 121 is configured to receive a drive signal $U_D$ 132 generated by a primary controller 124 to control switching of the power switch 121 to control a transfer of energy from the input of the power converter 100, through the energy transfer element 110, to the output of the power converter 100. The primary controller 124 is included in a power converter controller 122 that also includes a secondary controller 123, which generates a request signal $U_{REQ}$ 134 configured to be received by the primary controller 124 through a communication link 125. In the example, the communication link 125 maintains the galvanic isolation between the input of the power converter 100 and the output of the power converter 100.

As shown in the example of FIG. 1, the secondary controller 123 includes a comparator 129 configured to receive an output signal representative of the output voltage $V_O$ 115 of the output of the power converter 100. The comparator 129 is configured to generate a first constant voltage signal $U_{CV1}$ 131 in response to a comparison of the output signal representative of the output voltage $V_O$ 115 and a reference signal $V_{REF}$ 130. In other examples, the comparator 129 can be an error amplifier that generates an error signal based on the difference between the output voltage $V_O$ 115 and voltage of reference signal $V_{REF}$ 130. In this example, the error signal can be received by the switch request circuit 126 to determine the appropriate switching frequency or duty cycle of the power switch 121.

A switch request circuit 126 is configured to receive the first constant voltage signal $U_{CV1}$ 131 and a fault signal $U_{FAULT}$ 128. The switch request circuit 126 is configured to generate the request signal $U_{REQ}$ 134 in response to the first constant voltage signal $U_{CV1}$ 131 and the fault signal $U_{FAULT}$ 128 to control switching of the power switch 121 of the power converter 100 to control the transfer of energy from the input of the power converter 100 to the output of the power converter 100. In one example, the switch request circuit 126 is also configured to generate a secondary drive signal 119 to control the switching of a secondary switch 120 coupled to the secondary winding 112 and the output return 136.

As shown in the depicted example, secondary controller 123 includes a power limit fault circuit 127 that is configured to receive the request signal $U_{REQ}$ 134 to generate the fault signal $U_{FAULT}$ 128 to indicate the existence of a fault in the power converter 100 in response to a rate of consecutive request pulses in the request signal $U_{REQ}$ 134 greater than a threshold. For instance, in one example, the rate of consecutive request pulses request signal $U_{REQ}$ 134 is used to indicate that there is an overload fault in the power converter. In one example, the power limit fault circuit 127 is also configured to receive the first constant voltage signal $U_{CV1}$ 131 to generate the fault signal $U_{FAULT}$ 128 to indicate the existence of a fault in the power converter 100 in response to the request signal $U_{REQ}$ 134 and the first constant voltage. In this example, the power limit fault circuit 127 is configured to generate the fault signal $U_{FAULT}$ 128 to indicate the fault existence in the power converter 100 in response to a threshold number of consecutive request pulses received in the request signal $U_{REQ}$ 134 between pulses of the first constant voltage signal $U_{CV1}$ 131. In one example, a threshold number of consecutive request pulses in the request signal $U_{REQ}$ 134 received between pulses of the first constant voltage signal $U_{CV1}$ 131 indicate that there is a short circuit fault in the power converter 100.

In operation, comparator 129 is configured to monitor the output voltage $V_O$ 115 to determine when the secondary controller 123 should generate a pulse in the request signal $U_{REQ}$ 134 to indicate to the primary controller to switch the power switch 121. When the output voltage $V_O$ 115 falls below the voltage of the reference signal $V_{REF}$ 130, the first constant voltage signal $U_{CV1}$ 131 transitions to a logic high. The switch request circuit 126 is configured to generate a request signal $U_{REQ}$ 134 in response to the first constant voltage signal $U_{CV1}$ 131. The request signal $U_{REQ}$ 134 can be communicated across the communication link 125, which can communicate the request signal $U_{REQ}$ 134 from the secondary controller 123 to the primary controller 124 while maintaining the galvanic isolation between the input and output of the power converter 100. The primary controller 124 is configured to output the drive signal $U_{DR}$ 132 to the power switch 121 to control the switching of power switch 121. The energy transfer element T1 110 charges while the power switch 121 is closed. When the power switch 121 is opened, energy is transferred across the energy element 110, and the output voltage $V_O$ 115 is increased such that output voltage $V_O$ 115 is greater than the voltage of reference signal $V_{REF}$ 130. The first constant voltage signal $U_{CV1}$ 131 transitions to a logic low when the output voltage $V_O$ 115 is greater than the voltage of reference signal $V_{REF}$ 130.

The power limit fault circuit 127 of the secondary controller 132 can detect if an output overload and/or if a short circuit has occurred in parallel. In other words, the existence of multiple fault conditions can be detected simultaneously to generate fault signal $U_{FAULT}$ 128.

To detect an output short circuit condition, a counter counts how often the request comparator continuously requests a request signal $U_{REQ}$ 134 to transfer more power to the output. After a certain count of continuous request signals are exceeded, the power limit fault circuit 127 generates a fault signal $U_{FAULT}$ 128 in response to the count being exceeded. The switch request circuit 126 ceases operation of the power converter when a fault signal $U_{FAULT1}$ 128 is received.

As will be discussed, in order to detect an overload, the power limit fault circuit 127 determines if the rate of request signals $U_{REQ}$ 134 is too high. In one example, a counter counts up when a request signal $U_{REQ}$ 134 is generated. In addition, the counter counts down at a fixed decay rate. Thus, if the rate of request signals in $U_{REQ}$ 134 exceeds the fixed decay rate, eventually a fault condition can be generated such that the power limit fault circuit 127 generates the fault signal $U_{FAULT}$ 128 to cease operation of the power converter.

Figure 2:
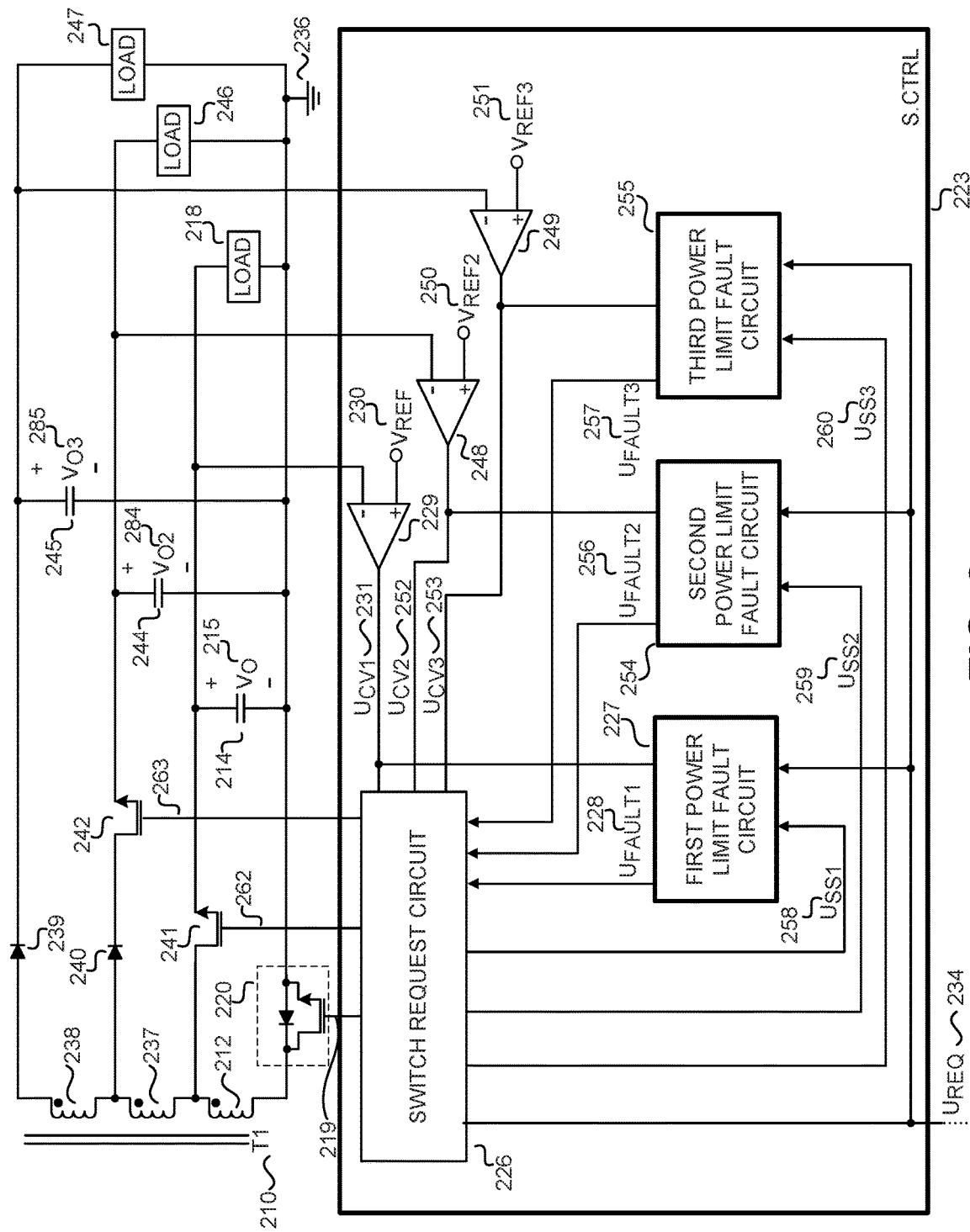
FIG. 2 illustrates one example of the secondary side of a power converter with a controller that can detect a fault for multiple outputs accordance with the teachings of the present invention.

FIG. 2 illustrates one example of the secondary side of a power converter having multiple outputs with a controller 223 that can detect the existence of a fault in the multiple outputs accordance with the teachings of the present invention. Although not illustrated for the sake of brevity, similar components for the primary side of the converter can be used as shown in FIG. 1. Thus, it is noted that controller 223 of FIG. 2 may be one example of controller 123 of FIG. 1, and that similarly named and numbered elements referenced below are coupled and function similar to as described above.

As will be discussed, with a power converter having multiple outputs, the power limit fault circuits 227, 254, and 255 illustrated in FIG. 2 are configured to receive select signals $U_{SS1}$ 258, $U_{SS2}$ 259, $U_{SS3}$ 260, respectively, to indicate when energy is transferred to the corresponding output from the primary winding. For example, a logic high of first select signal $U_{SS1}$ 258 indicates that the secondary winding 212 receives energy from the primary winding. In another example, a logic high of second select signal $U_{SS2}$ 259 indicates that the secondary winding 237 receives energy from the primary winding. In a further example, a logic high of third select signal $U_{SS3}$ 260 indicates that the secondary winding 238 receives energy from the primary winding. Each output of the power converter is monitored to detect an output overload condition power condition and/or a short circuit condition. Therefore, each output is also monitored by its own request comparator and power limit fault circuit. The operation of the power limit fault circuit for a multiple output power converter is similar to what is described in FIG. 1. With multiple outputs, the secondary controller can identify which outputs have a fault condition.

To illustrate, the example depicted in FIG. 2 shows an energy transfer element T1 210 including multiple secondary windings that are configured to transfer energy to respective loads 218, 246, and 247 that are coupled to the respective power converter outputs and output return 236. In particular, the secondary windings of energy transfer element T1 210 are illustrated as first secondary winding 212, second secondary winding 237, and third secondary winding 238. A rectifier 239 is illustrated as being coupled to the third secondary winding 238 and a rectifier 240 is illustrated as being coupled to second secondary winding 237. A controller 223 is also shown, and includes a first comparator 229, a second comparator 248, and a third comparator 249. In other examples as mentioned in FIG. 1, the first comparator 229, the second comparator 248, and the third comparator 249 can each be replaced with their own error amplifier. First comparator 229 is configured to receive a first output signal representative of a first output voltage $V_O$ 215 across first output capacitor 214 coupled to load 218, second comparator 248 is configured to receive a second output signal representative of a second output voltage $V_{O2}$ 284 across a second output capacitor 244 coupled to load 246, and third comparator 249 is configured to receive a third output signal representative of a third output voltage $V_{O3}$ 285 across third output capacitor 245 coupled to load 247. The first comparator 229 is configured to generate a first constant voltage signal $U_{CV1}$ 231 in response to a comparison of the first output signal and a first reference signal $V_{REF}$ 230, the second comparator 248 is configured to generate a second constant voltage signal $U_{CV2}$ 252 in response to a comparison of the second output signal and a second reference signal $V_{REF2}$ 250, and third comparator 249 is configured to generate a third constant voltage signal $U_{CV3}$ 253 in response to a comparison of the third output signal and a third reference signal $V_{REF3}$ 251.

A switch request circuit 226 is configured to receive the first constant voltage signal $U_{CV1}$ 231, the second constant voltage signal $U_{CV2}$ 252, and the third constant voltage signal $U_{CV3}$ 253. In addition, the switch request circuit 226 is also configured to receive a first fault signal $U_{FAULT1}$ 228, a second fault signal $U_{FAULT2}$ 256, and a third fault signal $U_{FAULT3}$ 257. In the illustrated example, the switch request circuit 226 is configured to generate the request signal $U_{REQ}$ 234, as well as a first select signal $U_{SS1}$ 258, a second select signal $U_{SS2}$ 259, and a third select signal $U_{SS3}$ 260 in response to the first constant voltage signal $U_{CV1}$ 231, the second constant voltage signal $U_{CV2}$ 252, the third constant voltage signal $U_{CV3}$ 253, the first fault signal $U_{FAULT1}$ 228, the second fault signal $U_{FAULT2}$ 256, and the third fault signal $U_{FAULT3}$ 257 to control switching of the power switch 121 of the power converter to control the transfer of energy from the input of the power converter to the loads 218, 246 and 247 that are coupled to the first, second, and third outputs of the power converter, respectively. In operation, the first select signal $U_{SS1}$ 258 is configured to indicate that energy is being transferred through the first winding 212 to the load 218 coupled to the first output. The second select signal $U_{SS2}$ 259 is configured to indicate that energy is being transferred through the second winding 237 to the load 246 coupled to the second output, and the third select signal $U_{SS3}$ 260 is configured to indicate that energy is being transferred through the third winding 238 to the load 247 coupled to the third output.

Furthermore, as shown in the illustrated example, the switch request circuit 226 is configured to generate a synchronous rectifier drive signal 219 to control synchronous rectifier 220. The switch request circuit is further configured to generate a first secondary drive signal 262 and a second secondary drive signal 263 to control secondary switches 241 and 242. In one example to provide power to a first output of the power converter, switch request circuit 226 generates the synchronous rectifier drive signal 219 to control synchronous rectifier 220 and a first secondary drive signal 262 to close first secondary switch 241. In another example to provide power to a second output of the power converter, switch request circuit 226 generates the synchronous rectifier drive signal 219 to control synchronous rectifier 220, and a second secondary drive signal 263 is generated by the switch request circuit 226 to close second secondary switch 242. In a further example to provide power to a third output of the power converter, switch request circuit 226 generates the synchronous rectifier drive signal 219 to control synchronous rectifier 220, turns off the first secondary switch 241 and second secondary switch 242. The first secondary switch 241 and secondary switch 242 can also be referred to as a selection MOSFETs to select which output will receive power.

The example depicted in FIG. 2 also illustrates a first power limit fault circuit 227 configured to receive the request signal $U_{REQ}$ 234, the first constant voltage signal $U_{CV1}$ 231, and the first select signal $U_{SS1}$ 258, a second power limit fault circuit 254 configured to receive the request signal $U_{REQ}$ 234, the second constant voltage signal $U_{CV2}$ 252, and the second select signal $U_{SS2}$ 259, and a third power limit fault circuit 255 configured to receive the request signal $U_{REQ}$ 234, the third constant voltage signal $U_{CV3}$ 253, and the third select signal $U_{SS3}$ 260.

The first power limit fault circuit 227 is configured to generate the first fault signal $U_{FAULT1}$ 228 to indicate a fault existence in the power converter in response to the first select signal $U_{SS1}$ 258 and a rate of request pulses occurring in the request signal $U_{REQ}$ 234. In addition, the first power limit fault circuit 227 is further configured to generate the first fault signal $U_{FAULT1}$ 228 to indicate the fault existence in the power converter in response to the first select signal $U_{SS1}$ 258 and a threshold number of consecutive request pulses in request signal $U_{REQ}$ 234 received between pulses of the first constant voltage signal $U_{CV1}$ 231.

The second power limit fault circuit 254 is configured to generate the second fault signal $U_{FAULT2}$ 256 to indicate a fault existence in the power converter in response to the second select signal $U_{SS2}$ 259 and the rate of request pulses occurring in the request signal $U_{REQ}$ 234. In addition, the second power limit fault circuit 254 is further configured to generate the second fault signal $U_{FAULT2}$ 256 to indicate the fault existence in the power converter in response to the second select signal $U_{SS2}$ 259 and a threshold number of consecutive request pulses in request signal $U_{REQ}$ 234 received between pulses of the second constant voltage signal $U_{CV2}$ 252.

The third power limit fault circuit 255 is configured to generate the third fault signal $U_{FAULT3}$ 257 to indicate a fault existence in the power converter in response to the third select signal $U_{SS3}$ 260 and the rate of request pulses occurring in the request signal $U_{REQ}$ 234. In addition, the third power limit fault circuit 255 is further configured to generate the third fault signal $U_{FAULT3}$ 257 to indicate the fault existence in the power converter in response to the third select signal $U_{SS3}$ 260 and a threshold number of consecutive request pulses in request signal $U_{REQ}$ 234 received between pulses of the third constant voltage signal $U_{CV3}$ 253.

Figure 3:
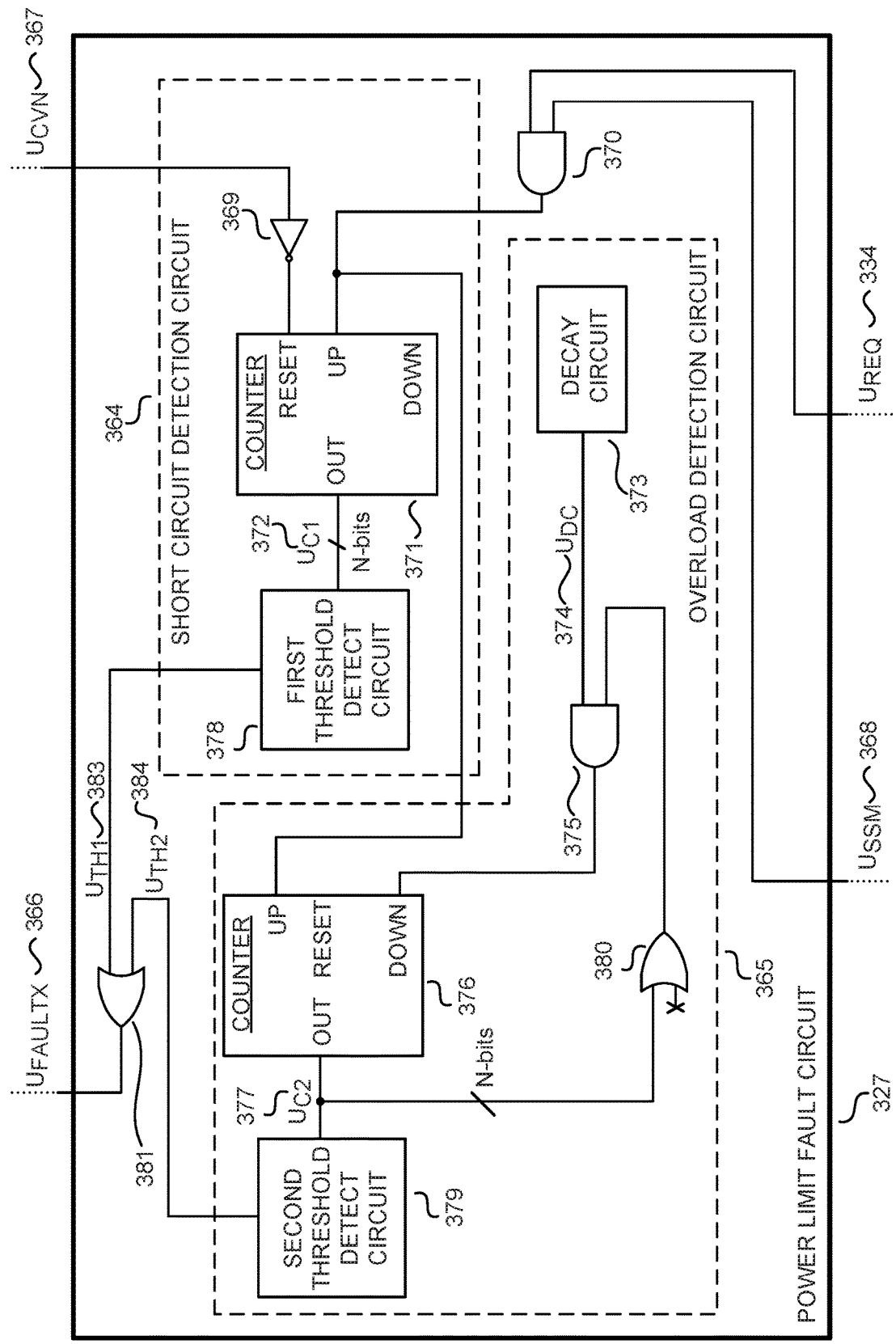
FIG. 3 illustrates one example of a power limit fault circuit in accordance with the teachings of the present invention.

FIG. 3 illustrates one example of a power limit fault circuit 327 in accordance with the teachings of the present invention. It is appreciated that power limit fault circuit 327 of FIG. 3 may be one example of first, second, or third power limit fault circuits 227, 254, or 255 of FIG. 2, or power limit fault circuit 127 of FIG. 1, and that similarly named and numbered elements referenced below are coupled and function similar to as described above. As shown in the depicted example, power limit fault circuit 327 is configured to receive a constant voltage signal $U_{CVN}$ 367, a request signal $U_{REQ}$ 334, and a select signal $U_{SSM}$ 368. Power limit fault circuit 327 includes a short circuit detection circuit 364, an overload detection circuit 365, a logic AND gate 370, and a logic OR gate 381.

The short circuit detection circuit 364 includes a first counter 371 and a first threshold detect circuit 378. The first counter 371 is configured to be reset in response to the constant voltage signal $U_{CVN}$ 367 through an inverter 369, and the first counter 371 is further configured to be incremented in response to the request signal $U_{REQ}$ 334 through logic AND gate 370 when the select signal $U_{SSM}$ 368 is a logic high. The first threshold detect circuit 378 is configured to receive the first counter output $U_{C1}$ 372 from the first counter 371. In one example, the first counter output $U_{C1}$ 372 from the first counter 371 is an N-bit signal. The first threshold detect circuit 378 is configured to output a first threshold detect signal $U_{TH1}$ 383 in response to a first threshold number of consecutive request pulses received between pulses of first constant voltage signal $U_{CVN}$ 367 as counted by the first counter 371. In one example, the logic OR gate 381 is configured to receive the first threshold detect signal $U_{TH1}$ 383 to generate a fault signal $U_{FAULTX}$ 366. In one example, the first threshold detect signal $U_{TH1}$ 383 can indicate a short circuit fault in the power converter. In another example, the first threshold detect signal $U_{TH1}$ 383 can indicate a short circuit or an overload fault in the power converter.

The overload detection circuit 365 includes a second counter 376, a second threshold detect circuit 379, a logic AND gate 375, a logic OR gate 380, and a decay circuit 373. The second counter 376 is configured to be incremented in response to the request signal $U_{REQ}$ 334 through logic AND gate 370 when the select signal $U_{SSM}$ 368 is a logic high. The second counter 376 is further configured to be decremented in response to the second counter output $U_{C2}$ 377 through logic OR gate and logic AND gate 375 when a decay signal $U_{DC}$ 374 from decay circuit 373 is logic high. In one example, the decay circuit 373 configured to generate the decay signal $U_{DC}$ 374 to have a fixed decay frequency. In one example, the second counter output $U_{C2}$ 377 from the second counter 376 is also an N-bit signal. The second threshold detect circuit 379 configured to receive the second counter output $U_{C2}$ 377 from the second counter 376. The second threshold detect circuit 379 is configured to output a second threshold detect signal $U_{TH2}$ 384 in response to an increased rate of consecutive request pulses occurring in the request signal $U_{REQ}$ 334 received through logic AND gate 370 exceeding a second threshold. The logic OR gate is also configured to receive the second threshold detect signal $U_{TH2}$ 384 such that the fault signal $U_{FAULTX}$ 366 is generated in response to the first threshold detect signal $U_{TH1}$ 383 or the second threshold detect signal $U_{TH2}$ 384.

In operation, the short circuit detection circuit 364 receives the request signal $U_{REQ}$ 334 through logic AND gate 370 when the select signal $U_{SSM}$ 368 is logic high. The select signal $U_{SSM}$ 368 corresponds to when the corresponding output of the power converter is selected to receive an energy transfer. For instance, referring briefly back to FIG. 2, if the first secondary winding 212 coupled the first output coupled to load 218 is selected to receive energy from the primary winding of energy transfer element 210, the first select signal $U_{SS1}$ 258 transitions to a logic high.

Referring back to FIG. 3, the request signal $U_{REQ}$ 334 indicates when the particular output indicated by select signal $U_{SSM}$ 368 requests an energy transfer. The output of logic AND gate 370 is configured to transition to logic high when both of the request signal $U_{REQ}$ 334 and the select signal $U_{SSM}$ 368 are logic high, and the first counter 371 is incremented, accordingly. If the constant voltage request signal $U_{CVN}$ 367 is a logic low, that indicates that the corresponding output voltage is not below a threshold, and the first counter 371 is reset through an inverter 369. In other words, a logic low signal of the constant voltage signal $U_{CVN}$ 367 is inverted by inverter 369, which resets the first counter 371. The first threshold detect circuit 378 is configured to receive the first count $U_{C1}$ 372. As shown in the depicted example, the first count $U_{C1}$ 372 is a digital number that contains N-bits. If the first threshold detect circuit 378 detects that the first count $U_{C1}$ 372 exceeds a first threshold, the first threshold detect circuit 378 transitions the first threshold detect signal $U_{TH1}$ 383 to a logic high. In one example, a logic high of the first threshold detect signal $U_{TH1}$ 383 indicates the detection or existence of a short circuit fault in the power converter.

Similar to the short circuit detection circuit 364, the overload detection circuit 365 also receives the request signal $U_{REQ}$ 334 through logic AND gate 370 when the select signal $U_{SSM}$ 368 is logic high. As mentioned previously, the select signal $U_{SSM}$ 368 corresponds to when the corresponding output of the power converter is selected to receive an energy transfer. The second counter 376 is configured to be incremented when the output of logic AND gate 370 transitions to logic high when both of the request signal $U_{REQ}$ 334 and the select signal $U_{SSM}$ 368 are logic high. The decay circuit 373 is configured to output the decay signal $U_{DC}$ 374 with a set or fixed frequency. Logic AND gate 375 is configured to receive the decay signal $U_{DC}$ 374 and the second count $U_{C2}$ 377 output of the second counter 376 through logic OR gate 380. In one example, the second count $U_{C2}$ 377 is also a digital number that contains N-bits. The output of logic AND gate 375 is coupled to count down (i.e., decrement) the second counter 376. The second threshold detect circuit 379 is also configured to receive the second count $U_{C2}$ 377. If the rate at which the request signal $U_{REQ}$ 334 increments the second counter 377 is greater than the rate that the decay signal $U_{DC}$ 374 decrements the second counter 377, then the second threshold detect circuit 379 generates a second threshold detect signal $U_{TH2}$ 384 when the second threshold detect circuit 379 detects that the second count $U_{C2}$ 377 from the second counter 376 exceeds a second threshold. In one example, a logic high of the second threshold detect signal $U_{TH2}$ 384 indicates the detection or existence of an overload fault in the power converter.

The logic OR gate 381 is configured to receive the first threshold detect signal $U_{TH1}$ 383 and the second threshold detect signal $U_{TH2}$ 384. If either the first threshold detect signal $U_{TH1}$ 383 or the second threshold detect signal $U_{TH2}$ 384 is a logic high, the fault signal $U_{FAULTX}$ 366 transitions to logic high to indicate the detection or existence of a fault in response to counting the request pulses in the request signal $U_{REQ}$ 334 as described in accordance with the teachings of the present invention.

Figure 4:
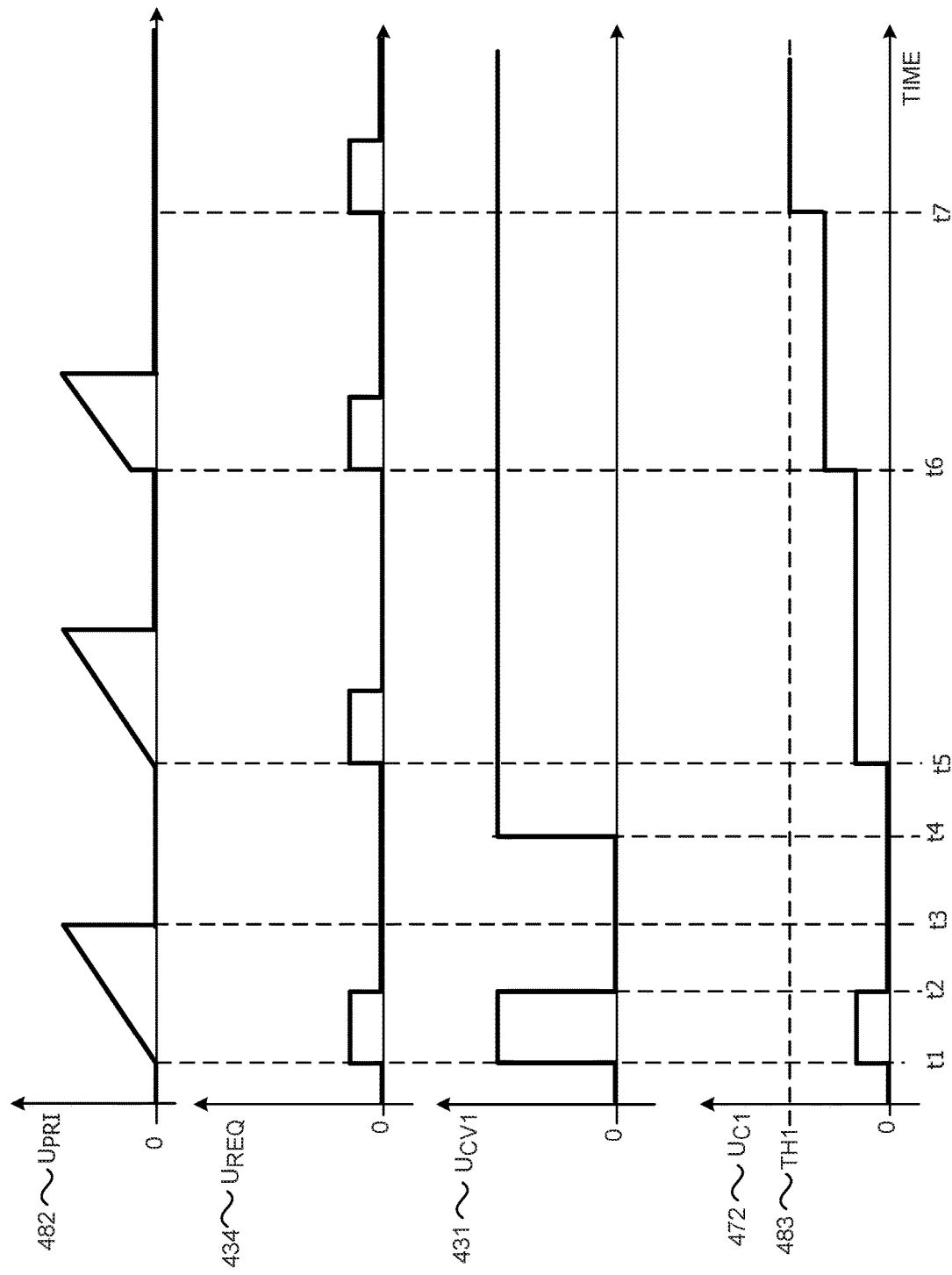
FIG. 4 illustrates an example timing diagram of signals in a power converter for detecting a short circuit fault using a controller in accordance with the teachings of the present invention.

FIG. 4 illustrates an example timing diagram of signals in a power converter for detecting a short circuit fault using a controller in accordance with the teachings of the present invention. It is appreciated that the signals illustrated in FIG. 4 may be examples of corresponding signals illustrated or described above in FIGS. 1-3, and that similarly named and numbered signals referenced below are coupled and function similar to as described above. As shown in the depicted example, FIG. 4 illustrates a primary current signal $U_{PRI}$ 482, which represents a primary current through a primary winding, such as primary winding 108, a request signal $U_{REQ}$ 434, a first constant voltage signal $U_{CV1}$ 431, a first count $U_{C1}$ 472, and a first threshold TH1 483. In the illustrated example, the output voltage of the power converter does not reach the voltage reference, which causes the first counter not to be reset after time t4 and the power converter controller can detect an output short circuit fault when a threshold count is exceeded.

To illustrate, at time t1, primary current signal $U_{PRI}$ 482 starts at zero and the request signal $U_{REQ}$ 434 transitions to a logic high, which causes the power switch to close and current to begin flowing through the primary winding as illustrated with primary current signal $U_{PRI}$ 482 beginning to ramp up. The first constant voltage signal $U_{CV1}$ 431 transitions to a logic high, which indicates that an output voltage is below a voltage reference. The count of the first counter is incremented, as shown by the increase in first count $U_{C1}$ 472.

Between time t1 and t2, the primary current continues to rise as the request signal $U_{REQ}$ 434 has been communicated to the primary controller to close or turn on the power switch.

At time t2, the first constant voltage signal $U_{CV1}$ 431 transitions to a logic low, which indicates that the output voltage has reached a voltage reference. As a result, the first counter is reset as shown by the first count $U_{C1}$ 472 is reset back to zero. In other examples, the first constant voltage signal $U_{CV1}$ 431 may transition to a logic low at a moment between time t3 and t4, indicating the output voltage is above the voltage reference.

At time t3, the primary current signal $U_{PRI}$ 482 falls to zero as shown as the power switch is opened.

At time t4, the first constant voltage signal $U_{CV1}$ 431 transitions to a logic high, which indicates that the output voltage has fallen below the voltage reference.

At time t5, primary current signal $U_{PRI}$ 482 starts at zero and the request signal $U_{REQ}$ 434 transitions to a logic high, which causes the power switch to close and current to begin flowing again through the primary winding as illustrated with $U_{PRI}$ 482 beginning to ramp up. The first constant voltage signal $U_{CV1}$ 431 remains a logic high, which indicates that the output voltage is still below the voltage reference, and the first counter is incremented.

At time t6, the first count $U_{C1}$ 472 continues to be incremented or increase since the first constant voltage signal $U_{CV1}$ 431 remains at a logic high, which indicates that the output voltage remains below the voltage reference.

At time t7, the first count $U_{C1}$ 472 continues to be incremented or increase since the first constant voltage signal $U_{CV1}$ remains at a logic high. The first count $U_{C1}$ 472 reaches the first threshold TH1 483. At this time, the controller has detected the existence of an output short circuit fault condition, and the power converter therefore stops operating.

Figure 5:
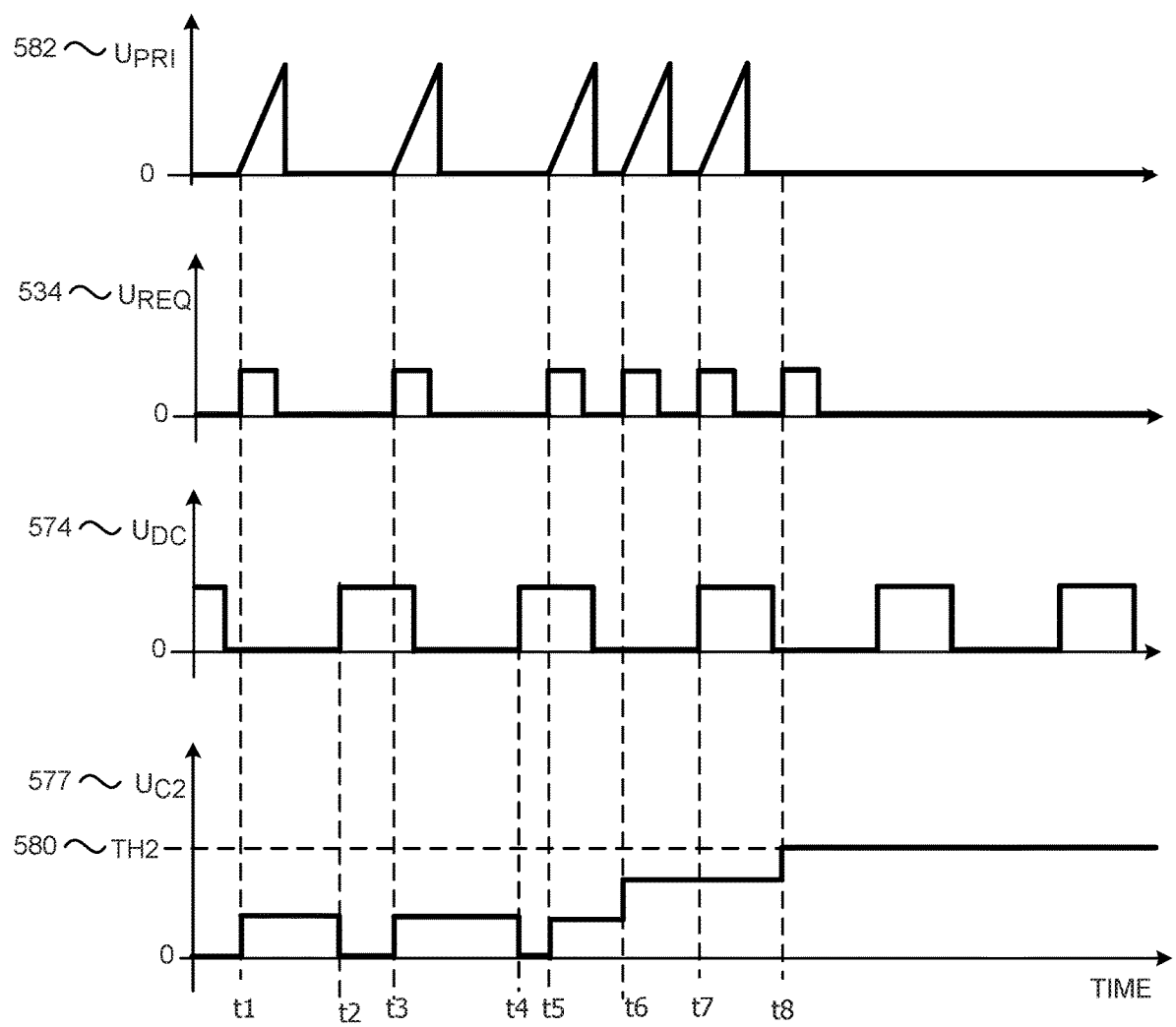
FIG. 5 illustrates an example timing diagram of signals in a power converter for detecting an overload fault using a controller in accordance with the teachings of the present invention.

FIG. 5 illustrates an example timing diagram of signals in a power converter for detecting an overload fault using a controller in accordance with the teachings of the present invention. It is appreciated that the signals illustrated in FIG. 5 may be examples of corresponding signals illustrated or described above in FIGS. 1-3, and that similarly named and numbered signals referenced below are coupled and function similar to as described above. As shown in the depicted example, FIG. 5 illustrates a primary current signal $U_{PRI}$ 582, which represents a primary current through a primary winding, such as primary winding 108, a request signal $U_{REQ}$ 534, a decay signal $U_{DC}$ 574, and a second count $U_{C2}$ 577, and a second threshold TH2 580. In the illustrated example, the power converter is overloaded, and therefore the rate of the request signals in request signal $U_{REQ}$ 534 exceeds the decay rate in the decay signal $U_{DC}$ 574 after time t4, which causes the second count $U_{C2}$ 577 to reach the second threshold TH2 580.

To illustrate, at time t1, primary current signal $U_{PRI}$ 582 starts at zero and the request signal $U_{REQ}$ 534 transitions to a logic high, which causes the power switch to close and current to begin flowing through the primary winding as illustrated with primary current signal $U_{PRI}$ 582 beginning to ramp up. The state of the decay signal $U_{DC}$ 574 is at logic low, and the second count $U_{C2}$ 577 is incremented in response to the request signal $U_{REQ}$ 534.

At time t2, the decay signal $U_{DC}$ 574 transitions to a logic high, and the second count $U_{C2}$ 577 is decremented in response to the decay signal $U_{DC}$ 574.

At time t3, the primary current signal $U_{PRI}$ 582 is at zero and the request signal $U_{REQ}$ 534 transitions to a logic high, which causes the power switch to close and current to begin flowing again through the primary winding as illustrated with the primary current signal $U_{PRI}$ 582 beginning to ramp up. The second count $U_{C2}$ 577 is incremented in response to the request signal $U_{REQ}$ 534.

After time t3, the primary current signal $U_{PRI}$ 582 continues to rise as the power switch is still closed.

At time t4, the decay signal $U_{DC}$ 574 transitions to a logic high, and the second count $U_{C2}$ 577 is decremented in response to the decay signal $U_{DC}$ 574.

At time t5, although the decay signal $U_{DC}$ 574 is still a logic high, but the rate of the request pulses in the request signal $U_{REQ}$ 534 is greater than the rate of pulses in the decay signal $U_{DC}$ 574, and the second count $U_{C2}$ 577 is therefore incremented and continues to increase in response to the request signal $U_{REQ}$ 534.

At time t6, the decay signal $U_{DC}$ 574 is logic low, and the second count $U_{C2}$ 577 is incremented in response to the pulse in the request signal $U_{REQ}$ 534.

At time t7, although the decay signal $U_{DC}$ 574 is logic high, the rate of pulses in the request signal $U_{REQ}$ 534 is equal or greater than the rate of pulses in the decay signal $U_{DC}$574, and the second count $U_{C2}$ 577 remains the same.

At time t8, the decay signal $U_{DC}$ 574 is logic low, and the second count $U_{C2}$ 577 is incremented in response to the pulse in the request signal $U_{REQ}$ 534. As such, the second count signal $U_{C2}$ 577 reaches the second threshold TH2. At this time, the controller has detected the existence of an overload fault condition, and the power converter therefore stops operating.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A method, comprising:
   responsive to comparing an output signal representative of an output voltage of an output of a power converter that receives energy, to a first reference signal, generating a first constant voltage signal;
   responsive to the first constant voltage signal, generating a request signal and a select signal representative of the output of the power converter;
   responsive to the request signal, transferring energy from an input of the power converter to the output of the power converter by controlling a switching of a power switch;
   responsive to the first constant voltage signal and the request signal, incrementing a fault threshold count in response to consecutive request signals;
   responsive to the fault threshold count exceeding a threshold number, generating a first fault signal indicative of a power limit fault; and
   responsive to the first fault signal, ceasing operation of the power converter by ceasing the transferring of energy from the input of the power converter to the output of the power converter.

2. The method of claim 1, further responsive to the fault threshold count to indicate a short circuit fault in the power converter.

3. The method of claim 1, further comprising, responsive to a rate of the consecutive request signals and the select signal, generating the first fault signal to indicate an overload fault in the power converter.

4. A controller for a multiple output power converter, comprising:
   an error amplifier configured to generate an error signal based on a difference between an output signal of a multiple output power converter and a reference signal;
   a switch request circuit configured to generate a request signal in response to the error signal, the switch request circuit further configured to generate a select signal representative of which output of the multiple output power converter receives energy, the switch request circuit further configured to control a switching of a power switch of the multiple output power converter to transfer energy from an input of the multiple output power converter to an output of the multiple output power converter; and
   a power limit fault circuit comprising at least one counter and configured to receive the request signal and the error signal, the power limit fault circuit further configured to generate a first fault signal for ceasing operation when the at least one counter is incremented by consecutive request signals in response to an output overload or short circuit.

5. The controller of claim 4, wherein each output of the multiple output power converter is coupled to a corresponding power limit fault circuit.

6. The controller of claim 4, wherein the controller is a secondary controller that communicates to a primary controller that is galvanically isolated between the input of the multiple output power converter and the output of the multiple output power converter.

7. The controller of claim 6, wherein the request signal is configured to be received by the primary controller through a communication link.

8. The controller of claim 4, wherein the switch request circuit is further configured to receive the error signal to determine a switching frequency or duty cycle of the power switch.

9. The controller of claim 4, wherein the switch request circuit is further configured to generate a synchronous drive signal to control switching of a synchronous rectifier coupled to a first output of the multiple output power converter.

10. The controller of claim 4, wherein the switch request circuit is further configured to generate a first secondary drive signal to control switching of a first secondary switch coupled to a first output of the multiple output power converter.

11. The controller of claim 4, wherein the at least one counter comprises a first counter and a second counter.

12. The controller of claim 11, wherein the power limit fault circuit comprises:
   a short circuit detection circuit, comprising:
     the first counter configured to be reset in response to the error signal, the first counter further configured to increment a first counter output in response to the request signal and the select signal; and
     a first threshold detect circuit configured to receive the first counter output from the first counter, the first threshold detect circuit configured to output a first threshold detect signal in response to a first threshold number of consecutive request pulses received between pulses of the error signal;
   an overload detection circuit, including comprising:
     the second counter configured to increment a second counter output in response to the request signal and the select signal, the second counter further configured to decrement an input of the second counter in response to an output of the second counter and a decay signal;
     a second threshold detect circuit configured to receive the second counter output from the second counter, the second threshold detect circuit further configured to output a second threshold detect signal in response to an increased rate of consecutive request pulses occurring in the request signal exceeding a second threshold; and
   a first logic gate configured to generate the first fault signal in response to the first threshold detect signal or the second threshold detect signal.

13. The controller of claim 12, wherein the overload detection circuit further comprises:
   a third logic gate configured to receive the second counter output; and
   a fourth logic gate configured to receive an output of the third logic gate and the decay signal, the second counter further configured to decrement an input of the second counter in response to an output of the fourth logic gate and the decay signal.

14. The controller of claim 12, wherein the overload detection circuit further comprises a decay circuit configured to generate the decay signal having a fixed decay frequency.

* * * * *